Patented Feb. 5, 1952

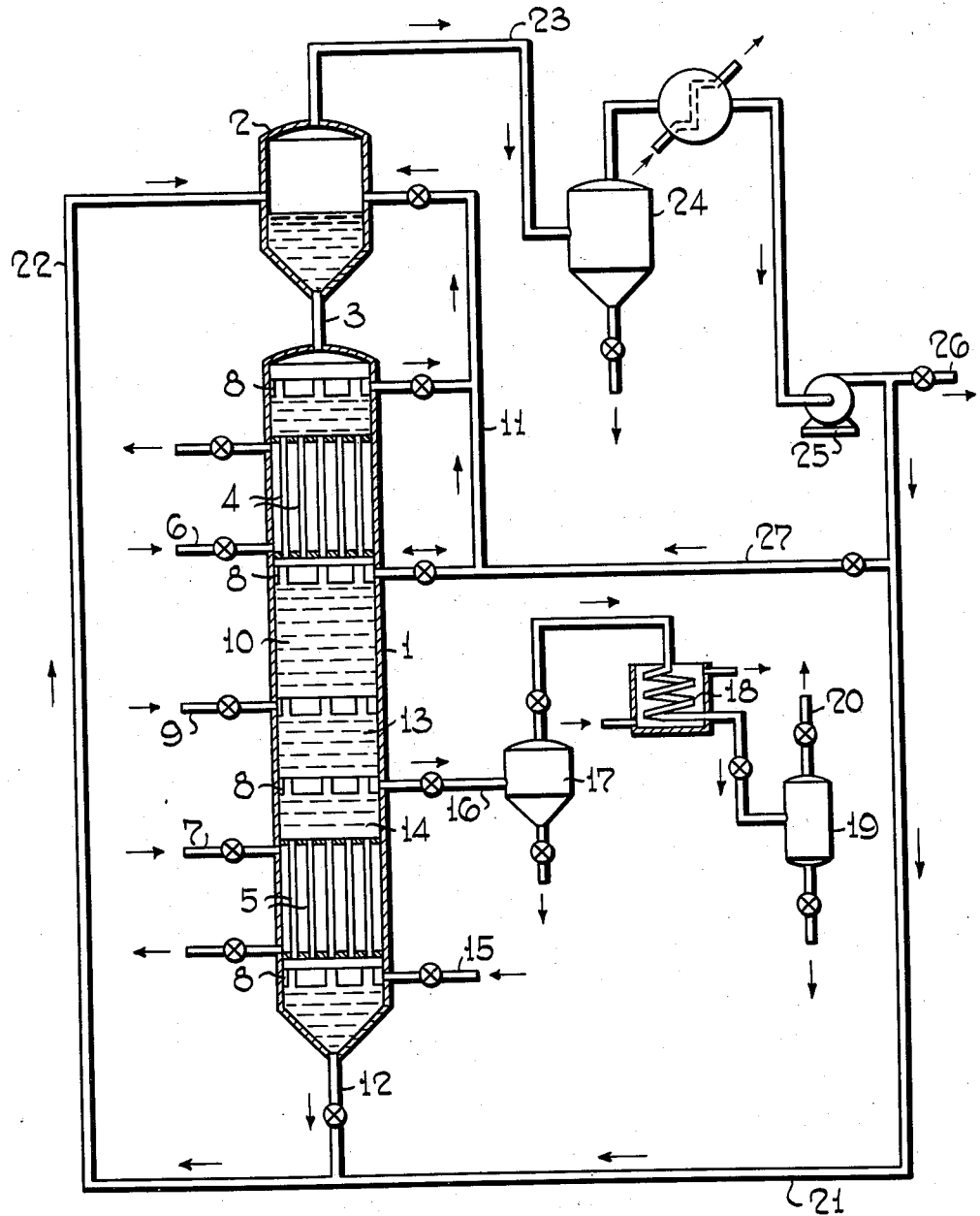

2,584,296

UNITED STATES PATENT OFFICE 2,584,296

PROCESS FOR COUNTERCURRENT CONTACTING OF SOLIDS AND GASES

Harold W. Scheeline, West Orange, N. J., assignor to Standard Oil Development Company, a corporation of Delaware Application November 30, 1946, Serial No. 713,331

14 Claims. (Cl. 183—114.2)

1

This invention relates to improvements in the art of countercurrent contacting of vapors with moving masses of solid particles and has special application to methods for improving the heating and cooling of such solid masses. It applies to the fractionation of gaseous or vaporous mixtures as well as to other processes involving gas and solid contact.

The fractionation of a gaseous mixture by causing it to flow upwardly through an adsorption zone where it contacts an adsorbent material such as silica gel or carbon in small particle or powdered form which is passed downwardly through this zone has been already described. The adsorbent leaving the bottom of the adsorption zone is heated in contact with a stripping gas such as steam to desorb the adsorbed component of the gas, which is separately recovered. The stripped adsorbent is then cooled and returned to the top of the adsorption zone for reuse. In such operation the adsorbent exercises highly selective action if it is caused to pass downwardly through the adsorption zone with a substantially uniform motion with limited opportunity for turbulent flow or eddying in this zone, as such turbulence or internal eddy currents of solid within the adsorption zone interfere with the countercurrent movement of solids and vapors necessary for efficient fractionation. Hence, it is the practice to move the solid adsorbent downwardly through the adsorption zone at such a slow rate that the particles of adsorbent remain closely packed together and the flow of substantially all particles is uniformly downward, the upward flow of gases also being at a sufficiently low velocity as to cause no appreciable lifting or vibration of the solid material.

It has been found, however, that the transfer of heat through a stationary wall, as in a conventional tube-and-shell heat exchanger, to or from such a dense bed of solid materials is very difficult. The solid materials usually have poor thermal conductivity and the rate of flow of gases therethrough is necessarily too slow to provide the desired high rate of heat transfer. The method of heat transfer is believed to be largely from wall to gas to solid particles. Non-turbulent conditions prevent hot gases near the wall from contacting cold solids near the center of the tube. It has been observed that the rate of transfer of heat to or from such masses of solid particles is greatly increased when these particles are suspended in a gas stream rising at a sufficient velocity to impart a vibratory or turbulent motion to the particles.

2

An object of the present invention is to provide for improved heat transfer to or from solid particles in conjunction with the passage of such particles through a column in which uniform, non-turbulent motion is desired. A further object of the invention is to provide for improved heat transfer to or from a stream of moving solid particles while still securing the stage effects of countercurrent flow of gas and solid through such heating or cooling zones. These and other objects of this invention will be apparent from the following description of one method of its application in a process for fractionation of a mixture of hydrocarbon gases by means of granular activated carbon. A suitable apparatus for use in this process is shown in sectional elevation in the attached drawing.

In the drawing a tall cylindrical vessel 1 is supplied with granular actviated carbon such as steam activated cocoanut charcoal of a particle size of about 0.1 to 0.01 inch diameter from a hopper 2 by line 3 until the vessel is completely filled with carbon. This vessel contains in its upper portion a bundle of vertical parallel cooling tubes 4 open at both ends and in its lower portion a similar bundle of heating tubes 5. A cooling fluid such as water is circulated around the cooling tubes 4 from line 6 and a heating fluid such as Dowtherm or steam or flue gases is circulated around the heating tubes 5 from line 7. The tower 1 also contains several gas distributing plates or baffles 8.

A gaseous hydrocarbon mixture, such as a fraction of gases obtained by cracking petroleum oil and containing hydrogen, methane, ethane and ethylene, is passed into a mid-section of the adsorption zone from line 9 and is caused to pass upwardly through the adsorption zone 10, the unadsorbed gases being withdrawn by line 23. Line 11 is for by-passing part of gas around the cooler, if desired. During this operation the solid adsorbent is continuously withdrawn from the bottom of the tower 1 through line 12. Additional adsorbent is continuously supplied to the top of the adsorption tower through line 3, thus providing a downward motion of adsorbent through the cooling tubes 4, the adsorption zone 10, the rectification zone 13, the stripping zone 14 and the heating tubes 5. The cooling tubes 4 are preferably operated to supply the adsorbent to the adsorption and rectification zones 10 and 13 at a temperature of about 100° to 120° F. in the present example, with the tower operated at a moderate pressure of about 1 to 4 atmospheres. The adsorbed $C_2$ hydrocarbons are removed from the carbon by heating to a suitable temperature of about 350 to 450° F. in the heating tubes 5 and this desorption is further aided by means of a stripping gas such as steam supplied below the heating tubes through line 15. A mixture of steam and desorbed $C_2$ hydrocarbons is withdrawn from the tower 1 through line 16 and is passed through a cyclone separator 17 to remove dust or fines, a cooler 18 to condense the steam and a separator 19 to remove the condensed water providing a concentrated $C_2$ hydrocarbon fraction in line 20.

The carbon is withdrawn by line 12 through a suitable measuring valve which prevents backflow of gas, such as a star valve feeder, or a reciprocating feeder valve having offset supply and discharge tubes. The withdrawn carbon is returned to the hopper 2 by any suitable methods such as by suspension in a stream of inert or recycled unadsorbed gas supplied through line 21 at a sufficient velocity to provide a dilute suspension of carbon in the resulting gas mixture, this suspension being passed through line 22 into the upper portion of the hopper 2 suitably constructed in the form of a cyclone or centrifugal separator so that the entrained carbon separates in this hopper and the gas passes out at the top through line 23. Entrained dust or fines is separated from this gas in the cyclone separator 24 and the gas may then be cooled if desired. A portion of this gas may be recycled by blower 25 to line 21, the remaining unadsorbed gases being withdrawn through line 26. During long continued operation there may be a decrease in activity of the recycled adsorbent, especially if the feed contains sulfur or resin-forming diolefins. In such cases the adsorbent may be regenerated by heating to high temperatures of about 1000–1200° F. in the presence of steam or flue gas, either on an intermittent operation or by continuously passing a portion of the recycled adsorbent through such a regeneration zone.

The operation of the tower 1 is controlled to provide an upward velocity of gases in the zones 10, 13 and 14 which is less than that sufficient to lift or to cause vibratory motion of the solid adsorbent therein. For example, under the conditions described above, the charcoal adsorbent moves downwardly through this portion of the tower at a slow, uniform rate of from 0.1 to 2.5 feet per minute. The gases move upwardly through this portion of the tower at a velocity suitably less than 1.5 feet per second. (All velocities mentioned are based on the entire cross-section of the empty tower.) With finely divided solid adsorbents such as charcoal having a loosely packed bulk density of about 25 to 30 pounds per cubic foot, an upward gas velocity above about two feet per second is sufficient to cause partial lifting of the solid particles resulting in vibration; at somewhat higher gas velocities up to about 15 feet per second, the solid particles assume a state of intense turbulence resembling that of a boiling fluid, but are not completely entrained in the rising gas stream. That is, downward motion of the particles countercurrent to the rising gas stream is still possible. At higher gas velocities, the particles are entrained in the rising gas stream and lifted to such an extent that no substantial downward flow of the particles occurs and countercurrent flow of the solid and gas becomes impossible. In order to secure the desired vibratory motion or state of partial suspension of the solids flowing downwardly through the tubes 4 and 5, the tower 1 is operated so that the upward velocity of gases through these tubes is between the approximate limits of 2 and 15 feet per second and is preferably about 2 to 5 feet per second. This higher velocity of gas through the cooling tubes 4 is made possible by the design of the equipment, the total area in the tubes 4 in a horizontal section being substantially less, suitably about one-half to one-quarter of the area of the tower 1, although additional control of gas velocity through the tubes 4 may be obtained by recycling a portion of unadsorbed gas by line 27 to a distributing plate 8 in the tower 1 just below the cooling tubes 4.

The rate of flow of gas upwardly through the heating tubes 5 is controlled by the rate of supply of steam or other stripping gas in line 15. This preferably should not be sufficient to cause substantial vibration or turbulence of the solid particles in the stripping zone 14 just above the heating tubes 5, which again is made possible by the greater relative area of the zone 14 in comparison to the total sectional area of the tubes 5.

In working with relatively shallow carbon beds and narrow heat exchange tubes some difficulty may be encountered in receiving a uniformly distributed flow of the granular solid from zone 14, which non-vibratory motion exists, to the tubes 5, in which vibratory motion exists. Under such circumstances it may be desirable to by-pass part of the gases rising through the tubes 5 around the point at which solids enter the tubes. This may be done by inserting in each tube a pipe of substantially smaller diameter, extending from a point just below the top of the tube to a point from 6 inches to 24 inches above the top of the tube. The top of each of these small pipes should be so constructed (as, for example, in the form of an inverted U) as to prevent entry of solids into the pipe. Thus the upward velocity of gas at the top of the tubes 5 is reduced to a point where it will not interfere with the downward flow of solids. Alternatively, other devices, such as vertical screw feeders, can be inserted in the top of the tubes 5, to provide assurance of well-distributed downward flow of solids from zone 14 into the tubes.

An example of suitable operating conditions and equipment sizes for conducting the process as described above is as follows:

The tower 1 is 10 feet in diameter and 35 feet high between the heating and cooling sections. The heating section contains 1070 1.5 inch I. D. tubes 20 feet long; the cooling section contains 1020 2 inch I. D. tubes 20 feet long. The cross-sectional area of the tower thus is 78.5 square feet, of the heating section 13.2 square feet, and of the cooler 22.2 square feet. When supplying a cracked petroleum gas fraction to the tower at a rate of 25,740 pounds per hour and supplying stripping steam at the bottom of the tower at a rate of 10,500 pounds per hour and passing activated cocoanut charcoal of 0.1 inch average particle size downwardly through the tower at a rate of 354,000 pounds per hour, and controlling the tower conditions to provide the following pressures and temperatures:

|  | p.s.i.g. | °F |
|---|---|---|
| Top of tower (below cooler) | 27 | 120 |
| Feed point | 30 | 175 |
| Bottom of heating section | 35 | 400 | with a pressure drop of about 4 pounds across the cooler and 3 pounds across the heater, the superficial gas velocity through the cooler is about 6 feet per second, throughout the tower it is between .9 and 1.2 feet per second and through the heater it varies from about 2.3 feet per second at the bottom (steam only) to 5.3 feet per second at the top. The feed stock containing 14.2% hydrogen, 41.2% methane, 12.7% ethane, 31.4% ethylene and 0.5% heavier hydrocarbons can thus be separated substantially completely into a product stream containing the $C_2$ and heavier hydrocarbons and a residue gas containing the methane and hydrogen.

It is to be understood that the above-described operating conditions are presented for illustrative purposes and that suitable operating conditions will vary widely with the size and density of the solid material supplied to the column 1 and with the operating temperatures and pressures used therein. The gas rates described above apply in general with solid absorbents having a particle size greater than 500 microns and having a bulk density between about 25 and 50 pounds per cubic foot.

Another method for control of the operation of this process is by supplying and withdrawing gases to the various portions of the system with regulation of the pressure drop through the equipment. The solids are caused to vibrate when the pressure drop through one vertical foot of the loosely packed solids is equal or greater than the weight of a 1-foot column of such solids, both pressure drop and weight being expressed in terms of pounds per square inch. In order to avoid jiggling or vibratory motion of the solid particles, the pressure drop should be less than this limiting figure and is preferably about .5 to .7 times the weight of the 1-foot column. For example, considering solid particles having a bulk density of 72 pounds per cubic foot, the weight of a 1-foot column of such solids is 0.5 pound per square inch. If the gas velocity through a bed of such loosely packed solids (the top of the bed having no restraining pressure other than gas pressure) is controlled so that the pressure drop per vertical foot is less than .5 and preferably less than .35 pound per square inch, the solids will not vibrate or "jiggle." However, if the pressure drop is greater than .5 pound per square inch per foot of vertical height of bed, the solids will assume vibratory motion and, depending upon the gas velocity, will either vibrate quietly with little turbulent flow or, at higher gas velocities, will show extreme turbulence resembling that of a boiling liquid and at still higher velocities will be completely suspended in and carried along with the gas stream. Thus, the process of the present invention may be operated with solids of substantially any particle size and density by adjusting the gas pressure drop in zones where non-vibratory flow of solids is desired to a magnitude of about .5 to .7 times the weight of the column of solids and, in sections where vibratory motion is desired, by adjusting the pressure drop to a figure of about 1.0 to 1.2 times the weight of the column of solids. Thus, the pressure drop across various portions of the apparatus such as the tubes 4 may be readily determined and the rate of supply and withdrawal of gas to and from such tubes may be controlled by proper manipulation of the various gas control valves to hold the pressure drop within the desired limits.

Advantages to be gained in the control of motion of particles in the heat exchanger tubes as described above may be illustrated as follows, using a heat exchanger tube adapted for determination of the heat transfer coefficient between a bed of loosely packed solids therein of 0.1 inch average particle diameter and a fluid outside the tube wall. When passing a gas upwardly through the finely divided solid in the tube at a velocity up to about 1.5 feet per second, at which no vibration of the solid particles occurs, the heat transfer coefficient ranges between 1 and 5 B. t. u./hr./sq. ft. of wall per °F. $\Delta t$. When the gas flow is increased to 2 to 5 feet per second in which range the solid particles assume vibratory motion, the heat transfer coefficient increases from 10 to 30, while at gas velocities of 10 to 15 feet per second (the maximum permissible with this solid without a complete entrainment), the solid particles assume a violently turbulent motion and the heat transfer coefficient increases from 50 to 150.

For particles of different size and physical characteristics (i. e., density, shape, conductivity, etc.) substantially different limits of gas velocity would be expected which can be determined and controlled by considering the relation of the pressure drops to the weight of the solids as described above. The process of this invention is preferably used with solid particles of fairly uniform size, the largest particle being not more than two or three times the diameter of the smallest particles in any given operation. The process may be conducted with solid adsorbent particles ranging from about 300 mesh up to ¼ inch or larger, and is preferably conducted with particles that will flow freely through a vertical tube without agitation. The absolute values of the heat transfer coefficient will also be affected by characteristics of both gas and solid.

The heat transfer tubes used in this invention preferably have a length much greater than their diameter. This length is suitably from about 50 to about several hundred times the diameter. This relatively narrow diameter of the tubes serves to localize the zone of motion of the solid particles passing through the tube so that there is little mixing of particles over a range of more than a few tube diameters and a substantially countercurrent flow of gases and solids through the tubes is obtained in spite of the vibratory motion of the solid particles. This permits several countercurrent stripping stages to be obtained in the heating tubes, thus increasing the efficiency of the stripping zone 14. Similarly, the upward passage of gas through the cooling tubes 4 serves to remove steam contained in the solid as it leaves line 12, condensation of which during cooling would interfere with adsorption in zone 10.

This invention is also applicable to numerous other processes involving countercurrent contact of gas and solids. It may be used, for example, in chemical reactions involving gaseous or vaporous and solid reagents where countercurrent flow of solid and fluid reagent is desirable for carrying the reaction to completion. In this case the fluid reagent may be supplied near the bottom of column 1 and a gaseous stripping agent or inert gas or an additional stream of reagent may be supplied below the heat exchanger 5 which may be operated to heat or cool the solid product before withdrawal, both by indirect means through the heat exchanger walls and by direct contact with the gas or vapor supplied to the bottom of the heat exchanger.

This invention may also be used in catalytic reactions where the solid material is a catalyst which is used for a limited period of time and then withdrawn from the reactor either for discard or for reactivation and recycle to its upper portion. The invention is generally applicable to processes involving adsorption of one or more components from a gas mixture containing other less readily adsorbed compounds such as mixtures of naphtha and solvent vapors in methane, hydrogen or air. The invention is also generally applicable to fractionation processes of the type illustrated above, involving selective adsorption of one or more components from a mixture containing other components which are less readily adsorbed. In such operations it may be used to separate hydrocarbon mixtures into fractions of any desired boiling range or chemical structure by suitable selection of adsorbents and stripping agents in conformity with chromatographic principles. For example, paraffins, naphthenes, olefins, diolefins and aromatics may be obtained as separate fractions from mixtures of two or more of these classes of hydrocarbons with a silica gel adsorbent used in an adsorption process as described above in one or more stages according to the number of fractions to be separated. Similarly, organic vapors of different degrees of polarity may also be separated by selective adsorption on any suitable solid adsorbents.

I claim:

1. An improved solid-vapor contacting process, comprising continuously passing a granular solid downwardly in non-vibratory motion through a gas-treating zone countercurrent to a rising gas stream and in vibratory motion downwardly through a connecting zone countercurrent to a gas stream flowing upwardly at a relatively higher velocity than in said gas treating zone, and transferring heat by indirect heat exchange in said second zone.

2. In a process for concentrating a hydrocarbon fraction from a mixture of hydrocarbons by countercurrent contact with a granular activated charcoal of a particle size of about 0.1 to 0.01 inch diameter in which said adsorbent is passed downwardly through a gas adsorption and rectification zone at an entering temperature of about 100 to 120° F. and then downwardly through a connecting indirect heating zone of substantially smaller cross-sectional area in which it is heated to a temperature of about 350 to 500° F. and is then cooled and returned to the top of said gas-treating zone, and in which a feed gas mixture is supplied to the midportion of said gas-treating zone and is passed upwardly therethrough, and steam is passed into the bottom of said heating zone and is passed upwardly therethrough and a mixture of steam and the desorbed, concentrated hydrocarbon fraction is withdrawn from the lower portion of said gas treating zone, an improved method of operation comprising maintaining the upward velocity of gases throughout said treating zone below 1.5 feet per second and maintaining the upward velocity of steam and of the resulting steam hydrocarbon mixture in said heating zone to a rate between 2 and 5 feet per second in order to cause vibratory motion of the solid particles descending in said zone whereby the heat transfer rate in said zone is substantially increased.

3. Process according to claim 2, in which the said feed gas comprises a cracked petroleum gas mixture containing $C_2$ hydrocarbons, methane and hydrogen, and in which the desorbed product gas stream comprises $C_2$ hydrocarbons substantially free of methane and hydrogen.

4. An improved solid-vapor contacting process, comprising continuously passing a granular, solid material downwardly, and vaporous materials upwardly through vapor-treating and heat-exchange zones of contact, passing said materials in counter-current relation through a vapor-treating zone without appreciable vibratory motion of the solid material therein, and passing said materials in counter-current relation through an indirect heat exchange zone, increasing the relative velocity flow of said vaporous materials upward in said zone, inducing vibratory motion of said solid material within the zone, while maintaining downward flow of said material therethrough.

5. Process according to claim 4 in which vibratory motion of said solid materials is maintained without substantial vertical displacement of individual particles of said materials with relation to other particles thereof moving downwardly through a heat exchange zone, and substantially without turbulence of said solid and vaporous materials.

6. An improved solid-vapor contacting process, comprising continuously passing a granular, solid material downwardly, and a vaporous material upwardly through vapor-treating and heat exchange zones of contact, passing said materials in counter-current relation through a vapor-treating zone without appreciable vibratory motion of said solid material therein, passing said materials as a restricted stream of such materials through an indirect heat exchange zone, and increasing the relative velocity flow of vaporous materials upwardly through the heat exchange zone, inducing vibratory motion of the solid materials therein while maintaining downward flow of said solid material therethrough.

7. An improved solid-vapor contacting process, comprising continuously passing a granular, solid material downwardly and a vaporous material upwardly through vapor-treating and heat exchange zones of contact, passing said materials in counter-current relation through a vapor-treating zone without appreciable vibratory motion of said solid material therein, passing said materials through an indirect heat exchange zone as a plurality of individual streams of narrow cross section, and increasing the relative velocity flow of said vaporous material upward in said individual streams through the heat-exchange zone, inducing vibratory motion of the solid materials therein while maintaining downward flow of said solid material therethrough.

8. An improved solid-vapor contacting process, comprising continuously passing a selectively adsorbent, granular solid material downwardly, and a vaporous material upwardly through vapor-treating and heat-exchange zones, introducing a vaporous material to be selectively adsorbed into a mid-portion of said vapor-treating zone to flow upwardly therethrough in counter-current relation to said solid materials, without inducing appreciable vibratory motion of said solid materials in said zone, withdrawing unadsorbed vapors from an upper portion of said zone, passing solid materials and an adsorbed component of said vaporous materials downwardly into an indirect heat exchange zone in counter-current relation to a vaporous stripping medium for the adsorbed vapor passed upwardly therethrough at a velocity sufficient to induce vibratory motion of the solid material particles flowing downwardly through said zone, heating said solid materials in said zone, stripping said adsorbed component from said solid materials and removing a mixture of said component and the stripping medium from below said vapor-treating zone.

9. An improved solid-vapor contacting process, comprising continuously passing a granular, solid material downwardly, and vaporous materials upwardly through vapor-treating and heat-exchange zones of contact, arranged as a successive series of indirect cooling, vapor-treating and indirect heating zones, introducing the solid material downwardly through said zones in order and recycling said material from said heating zone to said cooling zone, introducing a vaporous material into said vapor-treating zone at a mid-point thereof to flow upwardly therethrough in countercurrent relation to said solid material, without inducing appreciable vibratory motion of said solid materials in said zone, passing said solid materials downwardly through said cooling and heating zones and vaporous materials upwardly therethrough in countercurrent relation as restricted streams of such materials in which the relative velocity flow of the vaporous materials in said streams is increased above that of the vaporous material in said vapor-treating zone, inducing vibratory motion of said solid material within the respective cooling and heating zones while maintaining downward flow of said solid material therethrough.

10. A process according to claim 9 in which the granular solid material is a selectively adsorbent material having a particle size of about 0.1 to 0.01 inch diameter.

11. Process according to claim 10, in which the upward gas velocity in said heating and cooling zones is within the range of 2 and 15 feet per second and the upward velocity of gas in said treating zone is below 1.5 feet per second.

12. Process according to claim 10, in which the upward gas velocity in said heating and cooling zones is within the range of 2 to 5 feet per second and the upward velocity of gas in said treating zone is less than 1.5 feet per second.

13. A process according to claim 9, in which the flow of vaporous material through said several zones of contact, expressed in pounds per square inch of pressure drop per foot through said zones, in said vapor-treating zone is not more than .7 times the weight of a 1-foot column of solid material, expressed in pounds per square inch, and in said cooling and heating zones is not more than 1.2 times the weight of a 1-foot column of said solid material.

14. A process according to claim 13, in which the rate of introduction of said vaporous materials, and the restriction of said streams of solid and vaporous materials through said cooling and heating zones are interadjusted to provide the specified flow of vaporous material.

HAROLD W. SCHEELINE.

REFERENCES CITED

The following references are of record in the file of this patent:

UNITED STATES PATENTS

| Number | Name | Date |
| --- | --- | --- |
| 1,422,007 | Soddy | July 4, 1922 |
| 1,835,557 | Burke | Dec. 8, 1931 |
| 1,836,301 | Bechthold | Dec. 15, 1931 |
| 1,920,122 | Chavanne | July 25, 1933 |
| 2,175,376 | Bush | Oct. 10, 1939 |
| 2,268,187 | Churchill | Dec. 30, 1941 |
| 2,476,472 | Arnold et al. | July 19, 1949 |

OTHER REFERENCES

"Hypersorption Process for Separation of Light Gases," Clyde Berg, A. I. Ch. E. Transactions, vol. 42, #4, August 25, 1946, pages 665 to 680.